INVENTOR.
JAN R. COYLE
BY
Paul A. Weilein
ATTORNEY

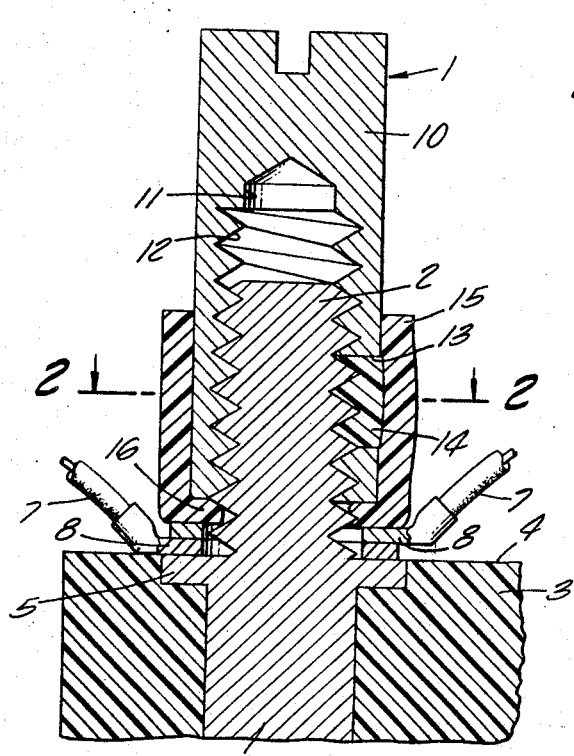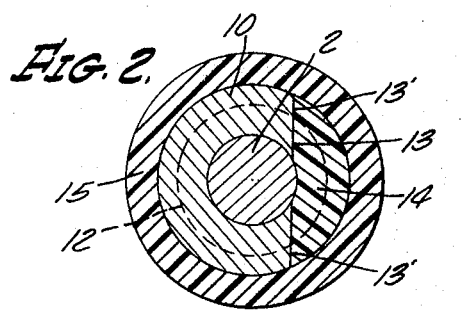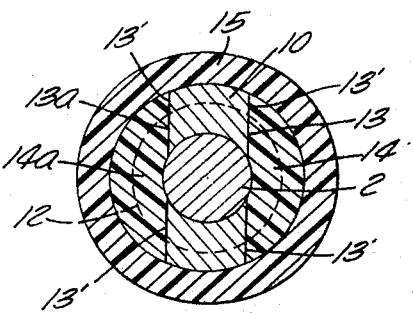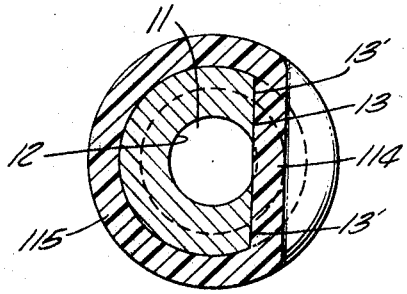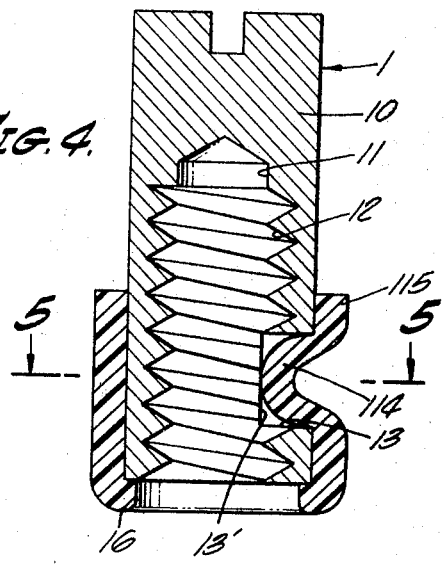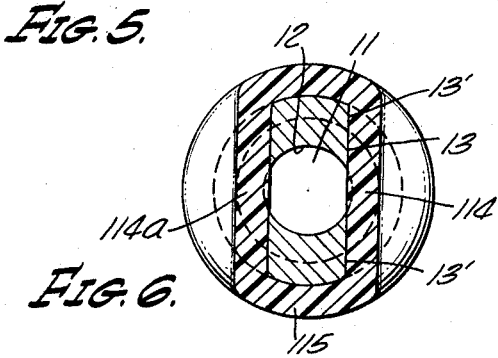
INVENTOR.
JAN R. COYLE
BY
ATTORNEY April 8, 1969 J. R. COYLE 3,437,118
INTERNALLY THREADED SELF-LOCKING FASTENER AND
METHOD OF MAKING THE SAME
Filed Oct. 10, 1966 Sheet 2 of 2

United States Patent Office 3,437,118
Patented Apr. 8, 1969

3,437,118
INTERNALLY THREADED SELF-LOCKING FASTENER AND METHOD OF MAKING THE SAME
Jan R. Coyle, San Dimas, Calif., assignor, by mesne assignments, to Threadline Fastener Corporation, Covina, Calif., a corporation of California
Filed Oct. 10, 1966, Ser. No. 585,537
Int. Cl. F16b 39/24
U.S. Cl. 151—7                                                                 5 Claims

ABSTRACT OF THE DISCLOSURE

A self-locking threaded fastener including an internally threaded body adapted to engage a threaded stem, the body having a slot containing a resiliently deformable insert engageable with the stem threads, said insert being restrained against outward displacement by a sleeve of heat shrinkable resiliently deformable material having an attaching portion surrounding the body and extending over the outer end of the insert, the attaching portion being shrunk into intimate tight embrace of the body prior to the fastener being engaged with an associated stem, said sleeve portion having an internal flange at one end for augmenting the action of the insert, and in the absence of an insert operating as a locking element by itself, the flange further providing an abutment seal at the inner end of the fastener.

---

The present invention relates to self-locking threaded fasteners and method of making the same, and more particularly to self-locking threaded fasteners of the internally threaded type provided with resilient means engageable with an externally threaded stem for holding the internally threaded member on the stem.

The present invention will be described in relation to internally threaded self-locking fasteners of the type adapted to be employed in combination with a binding post in making electrical connections but the features of the invention have application to self-locking nuts or fasteners of other utility.

In numerous applications it is the practice to provide a junction or terminal block having a number of electrically conductive binding posts projecting therefrom whereby electrical circuits may be completed by binding to the posts the usual conductor clips. Frequently due to space limitations the binding posts are quite small and the fastening devices heretofore available for binding the conductor clips on the posts and to the block have also been small and have had comparatively thin wall sections rendering difficult the utilization of the ordinary resilient locking elements of the nylon or other plastic material insert type. Moreover, such heretofore available self-locking fasteners have not been satisfactory inasmuch as they do not inherently avoid problems of electrical loss in the connection caused by destruction of silver or other plating on the electrical elements, nor have the prior self-locking fasteners provided effective means for sealing the connection as a guard against oxidation.

For example, the provision of a nylon pellet or insert in a radial hole in a thin-walled self-locking fastener is not practical due to the fact that thin walled fasteners are subject to deformation or distortion resulting from the formation of the tongs which retain the resilient insert in place. This is to say that when the wall thickness of the fastener is on the order of .020″ there is insufficient material thickness to sustain forces applied to stake over the margin of the outside of the fastener element and, therefore, the relatively thin walled section will be distorted, causing ultimate misfit with the terminal post, or alternatively, in such thin-walled fasteners the resilient element is so thin as to be ineffective to maintain any significant lateral force acting on the terminal whereby to prevent inadvertent loosening of the internally threaded fastener element.

An object of the present invention is to provide a self-locking fastener essentially constituting a nut applicable to terminal posts or to other stems and having novel resilient locking means for resisting removal of the nut from the stem, the resilient locking means being particularly beneficial in the event that the nut is of thin walled construction, but also being useful when employed in other typical nut constructions.

Another object of the invention is to provide a method of making nuts in accordance with the preceding object involving the application to a nut body of a resilient sleeve which is shrunk onto the nut, and a portion of which sleeve is adapted to retain a resilient insert in the nut, on the one hand, or to itself engage a portion of the complemental stem, on the other hand, so as to effect a resilient locking action. As will hereinafter be described, the resilient locking action is either of three general types of locking action, namely, (1) a locking action resulting from the application of a lateral force at one side of the stem to cause frictional coengagement of the other side of the stem within the nut, (2) the application of opposing resilient forces tending to centralize the nut on the stem and to frictionally resist relative movement between the same, and (3) the application of an axial force on the nut when it is applied to the stem whereby to impose a relative axial force tending to effect frictional coengagement of threads on the stem and the nut; included within the resultant locking actions herein referred to are certain combinations of the three specific actions referred to above.

Other objects and advantages of the invention will be hereinafter described or will become apparent to those skilled in the art, and the novel features of the invention will be defined in the appended claims.

In the accompanying drawings:

FIG. 1 is a view in section showing a fragmentary portion of a terminal block and an exemplary terminal post, with terminal clips applied thereto and held in place by an internally threaded self-locking fastener made in accordance with the invention;

FIG. 2 is a transverse sectional view as taken on the line 2—2 of FIG. 1;

FIG. 3 is a view corresponding to FIG. 2 but showing a modification of the self-locking fastener;

FIG. 4 is a view in longitudinal section through another embodiment of a self-locking fastener made in accordance with the invention;

FIG. 5 is a tranverse sectional view as taken on the line 5—5 of FIG. 4;

FIG. 6 is a view corresponding to FIG. 5 but showing a modification of the self-locking fastener of FIG. 4;

Like reference characters in the several views of the drawings and in the following description designate corresponding parts.

Figure 7:
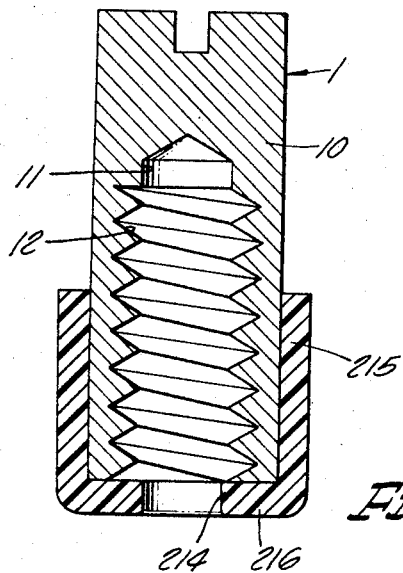
FIG. 7 is a longitudinal sectional view through another embodiment of a self-locking fastener made in accordance with the invention.

Referring first to FIGS. 1 and 2, an illustrative self-locking fastener 1 is shown made in accordance with the present invention and applied to a terminal post 2. This terminal post is illustrative of such posts which are commonly provided on a terminal block denoted at 3. In the illustrative showing the terminal block 3 has an upper surface 4 and the terminal post 2 has an outwardly extended contact flange 5 having a surface coplanar with the surface 4. The post 2 has a body section 6 which, as will be understood, extends through the block 3, and would be provided with a similar post at the other side of the block 3 so that an electrical connection can be made between leads or conductors connected to the posts at opposite sides of the block.

For illustrative purposes a pair of conductors 7 are shown each having connection with a conventional clip 8 constituting a ring adapted to be disposed about the post 2 with the lowermost ring in engagement with the contact flange 5 and the uppermost ring engaged with the ring therebelow. In this manner it is common to apply one or any desired plurality of the conductor supporting clips 8 to the post 2. Ordinarily, the clips 8 are plated with silver or other material and it is preferred that the plating not be disturbed or mutilated to expose the underlying metal in order to avoid the loss of electroconductivity. Moreover, when the connection has been made between the clips 8 and the terminal post, it is desired that the same be maintained notwithstanding vibration and that air be excluded from the connection so as to minimize oxidation.

In the embodiment of the self-locking fastener or nut of FIGS. 1 and 2, it comprises an elongated body 10 having a bore 11 opening at one end and internally threaded as at 12 for coengagement with the threads of the terminal post 2. At one side of the bore 11 is a radial opening 13 in which is disposed a resilient insert 14. Disposed about the outside of the body 10 and overlying the opening 13 so as to retain therein the insert 14 is a resilient sleeve 15 provided at an end with a flange 16 underlying the annular end face of the body 10 and adapted to engage the confronting clip 8 to force the same into engagement with the subjacent clip 8 or into engagement with the flange 5 in the event that only a single clip is present. Referring to FIG. 2 it will be noted that the opening 13 is formed by a chordal slot extended across the body, the base of the chordal slot being tangent to a circle of a diameter at least as great as the major diameter of the threads 12, and in the illustrative embodiment the chordal base of the slot is tangent to a circle which is slightly smaller than the minor diameter of the threads 12. It will also be noted that the insert 14 is of chordal form so as to be supported on bottom walls 13′, 13′ of the slot 13 provided by the side wall of nut 10. The intermediate or central section of the insert 14 extends inwardly past the major diameter of the threads 12 for engagement with and resilient deformation by the threads of the binding post 2 as fastener 1 is applied thereto.

Insert 14 is composed of a suitable resiliently deformable material such as nylon which is known to have the ability to recover its original form and which is known to maintain its resilient locking action. In the embodiment of FIGS. 1 and 2 the locking action is of a type resulting from the exertion of a lateral force tending to bias the mating threads at the opposite side of the post and nut 10 from the insert 14 into frictional coengagement.

The sleeve 15 previously referred to constitutes means for retaining the insert 14 against substantial outward displacement. This sleeve 15 is also composed of resiliently deformable material and in accordance with the method hereinafter to be described is composed of a heat shrinkable material which may have an initial inside diameter substantially equal to or larger than the outside diameter of the nut 10 and which may be placed about the end of the nut 10 and thereafter shrunk by the application of heat so as to tightly embrace the body 10. The flange 16 is also formed from the sleeve 15 due to the shrinkage of the sleeve in the presence of heat, as will be hereinafter described.

Suitabe resilient materials for the heat shrinkable sleeve 15 are available in the form of tubular members of various wall thicknesses composed of various polyethylene, vinyl, polytrifluoroethylene, Teflon, or polyamides which may be expanded by gamma radiation treatment so as to be subsequently shrunk by heat. Such materials are available which are shrinkable upon being subjected to temperatures ranging from about 200° F. up to 600° F. or more and the tube size may be reduced on the order of fifty percent, as is now well known in the art of applying tubular sleeves to electrical conductors.

It will now be recognized that the application of the self-locking fastener 1 to the terminal post 2 will result in the progressive engagement of the post thread with the resilient insert 14, causing it to resiliently conform to the threads of post 2. The insert 14 will exert the above described resilient force laterally of the terminal post to maintain a locking action, assisted by the resistance of the sleeve 15 overlying the opening 13 to outward deformation, such resistance preventing outward displacement of the insert 14. Thus, sleeve 15 and insert 14 combine functionally and structurally to provide the resilient locking action. As the end flange 16 of the shrunk-on sleeve 15 engages the uppermost clip 8 it will be deformed resiliently so as to both form an effective seal with the clip 8 and be forced inwardly into resilient engagement with the terminal post 2 resulting in further resilient locking action caused by the axial force imposed on the nut 10 and the resultant thread friction. When the self-locking fastener 1 is removed from the post the resilient material of which the insert 14 and the sleeve 15 are composed will recover so that the fastener may be reused.

Referring now to FIG. 3 a modification of the self-locking fastener 1 is shown wherein in addition to the resilient insert 14 in the slot 13 there is provided in angularly spaced relation thereto, and more particularly in diametrically spaced relation thereto, a second insert 14a identical to the insert 14 and disposed in a slot 13a identical to the slot 13. The distinction between the modification of FIG. 3 and the embodiment shown in FIGS. 1 and 2 is that the opposing inserts 14 and 14a cause a locking action which is essentially the result of friction between the inserts themselves and the threads of the terminal post 2. In addition, the inserts 14 and 14a centralize the fastener 1 upon the terminal post.

Referring now to FIGS. 4 and 5, there is shown another embodiment of the self-locking fastener 1, which constitutes a self-locking nut and which is adapted to be applied to electrical connections such as that previously described or to other threaded stems. In the embodiment of FIGS. 4 and 5 the nut 10 is identical to that previously described including the slot 13. Likewise, the sleeve 115 is identical to the sleeve 15 previously described. However, in this embodiment it will be noted that the resilient locking action provided by the insert 14 of FIGS. 1 and 2 is provided in FIGS. 4 and 5 wholly by a portion 114 of the sleeve 115. This portion 114 of sleeve 115 is formed as a result of the shrinking of the sleeve 115 onto the nut 10, the portion 114 shrinking into the slot 13 a sufficient distance so as to at least project past the major diameter of the threads 12.

Referring now to FIG. 6, there is illustrated a modification of the embodiment of FIGS. 4 and 5 in the same sense that the structure of FIG. 3 is a modification of the embodiment shown in FIGS. 1 and 2. In FIG. 6 the nut 10 has, in addition to the slot 13, a slot 13a and, in addition to the portion 114 of the sleeve 115 which extends into slot 13, a second portion 114a of the sleeve 115 extends into the second slot 13b. Thus, the locking action of the embodiment of FIGS. 4 and 5 is like the locking action of the embodiment of FIGS. 1 and 2, while the locking action of the modification of FIG. 6 is like that of the modification of FIG. 3.

In FIG. 7 a further self-locking fastener 1 embodying the invention is illustrated, wherein the nut 10, as distinguished from the embodiments and modifications thereof previously described, has no openings or slots corresponding to the slots 13 or 13a. Instead, in FIG. 7 the resilient sleeve designated 215 has an end flange 216 underlying the extremity of the nut 10 and having an inner marginal section 214 which projects inwardly at least past the major diameter of the internal thread 12 and in the illustrative embodiment slightly past the minor diameter of the threads 12. Thus, the peripheral portion 214 of flange 216 will engage the threads of a complementally threaded member to effect a self-locking action.

While the locking fasteners of the invention as thus far described have all been specifically illustrated as being of a type applicable to connector posts such as the connector post 2, the invention contemplates the use of such fasteners in other conventional nut applications. In addition, there is specifically shown in FIG. 8 a further embodiment of the invention comprising a typical hexagonal nut 310 having a bore 311 provided with threads 312. At the base of the nut 310 is an axially extended flange 320 having an undercut outer peripheral wall 321. Beneath the flange 320 is a resilient washer or ring 314. This ring or washer 314 is held in place by a shrunk-on sleeve 315 which engages the undercut outer wall 321 and has an end flange 316 underlying the washer 314. In the illustrative embodiment the washer 314 has an inside diameter less than the major diameter of the threads 312 and more specifically in the illustrative embodiment the inside diameter of the washer is less than the minor diameter of the threads 312, thus constituting a resilient locking element engageable with the threads of a threaded stem. Sleeve 315 is preferably of an external diameter no greater than the diametrical distance across opposing flats of the nut 310 so that a tool may be applied to the nut without interference.

Figure 10:
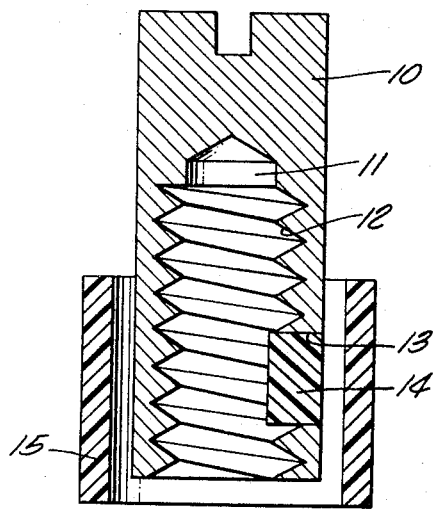
FIG. 10 is a view showing in longitudinal section the elements of FIG. 9 in a condition partially assembled in accordance with the method of the present invention.

The present invention, as indicated above, contemplates a method of making self-locking fasteners corresponding to the several embodiments and modifications thereof described above. Referring to FIG. 10 the method will be more particularly described in relation to the making of the embodiment of FIGS. 1 and 2.

Figure 8:
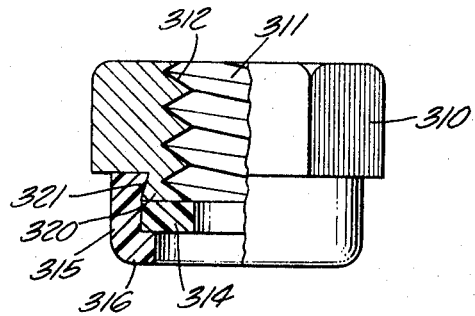
FIG. 8 is a view partly in side elevation and partly in longitudinal section through another embodiment of a self-locking fastener made in accordance with the invention.
Figure 9:
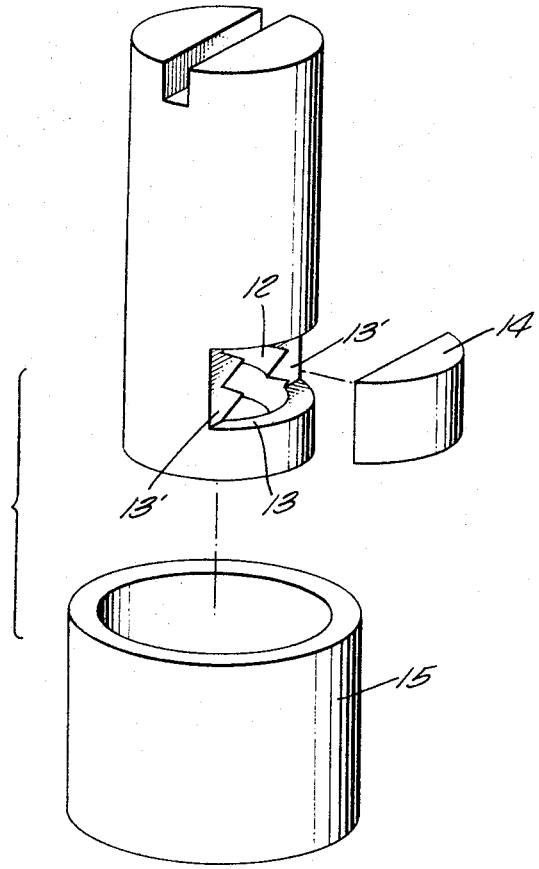
FIG. 9 is an exploded detail view showing in perspective the elements of the self-locking fastener of FIG. 1 in an intermediate stage of their assembly in accordance with the method of the present invention.

In accordance with the present method the nut body 10 is formed to provide the radial opening 13 of the desired depth and axial extent. If desired, the opening 13 may extend axially to and be open at the extremity of the body 10. Thereafter, the preformed insert 14 composed of resilient nylon or similar material as previously described is placed in the opening, bottoming on the walls 13′ of the nut body 10. In the event that the opening 13 be of some modified form or disposition such that no walls 13′ are present, that is, for example, in the event that the opening 13 is formed as a longitudinally extended slot, as is the case in certain known resilient locking fasteners, the width of the insert disposed in the slot should be such as to cause side wall interference with the walls defining the recess so as to prevent the insert passing through the slot into the bore of the nut body. At this point the resilient sleeve 15 composed of a heat shrinkable material, as described above, is disposed about the end of the nut body 10, as shown in FIG. 10. In the event that the article in accordance with the foregoing description is to be provided with a resilient sealing flange, such as the flange 16, or in the event that the article is as shown in FIG. 8 of such a construction that the flange 316 serves to retain the resilient locking element in place, as well as in the event that the sealing flange is to be such as designated at 216 in FIG. 7 so as to virtually constitute the resilient locking means, the nut body 10 and sleeve 15 are relatively axially positioned so that an end portion of the sleeve extends beyond the extremity of the nut body, as shown in FIG. 10. Thereupon, the sleeve 15 is subjected to heat at a temperature of a magnitude depending upon the specific material of which the sleeve is composed and for a period depending upon the desired shrinkage, since he shrinkage of certain of these materials is a function of the period during which the heat is applied. Heat may be applied either by direct flame application to effect a rapid shrinkage of the sleeve or the sleeve 15 may have a friction fit with the nut body 10 so that the components will be preliminarily held in assembly, as distinguished from the components as shown in FIG. 10, wherein a clearance exists between the inside of the sleeve 15 and the outside of the nut body 10. Such assembled elements may then be placed in a heating oven for a period of time to effect the desired shrinkage.

Referring to the embodiment of the invention shown in FIGS. 4 and 7, as well as to the modification of the embodiment of FIG. 6 as shown in FIG. 5, it will be understood that the method is substantially the same. In the case of the embodiment of FIG. 4, however, the insert 14 is not placed in the slot 13. Instead, heat is applied to the sleeve 115 to cause the sleeve to shrink into the recess 13, or into the recesses 13 and 13a of the modification of FIG. 6. In the case of the embodiment of FIG. 7, of course, it is unnecessary to form the slot 13 or any similar opening; instead, in this embodiment the sleeve 215 will be so axially positioned relative to the nut body 10 as to provide an axial end section projecting beyond the extremity of the nut body to such an extent that when the sleeve 215 is subjected to heat it will shrink and thereby project inwardly at least past the major diameter of the thread 12.

In respect of the embodiment of FIG. 8, it will now be apparent that the method would involve forming a nut body 312 to provide the axially extended flange 320 having the outer wall 321, and more specifically the outer wall is preferably undercut. Thereafter, the heat shrinkable sleeve 315 is applied about the flange and about the washer 314, and thereupon the application of heat will effect shrinkage of the sleeve 315 into interlocking engagement with flange wall 321, the end section of the sleeve 315 shrinking inwardly to retain the washer 314 in place.

While a number of specific embodiments of self-locking fasteners as well as modifications thereof and the method of making the various fasteners have been hereinabove specifically described in relation to specific illustrations thereof, it will be understood that changes and alterations in the details may be made without departing from the invention. However, in each of the structures it will be noted that the resilient locking means comprises the heat shrinkable sleeve which in certain configurations functionally and structurally combine with a separate element of resilient material in order to effect the locking action, but which in other embodiments includes the resilient locking elements as an integral part of the heat shrinkable sleeve. The portion of the resilient locking means which engages the stem, in any event, constitutes means cooperative with the threads for preventing relative movement of the nut and stem, and in some applications it is conceivable that the resilient locking action alone may suffice and the nut and stem may be plain or unthreaded. Selection of the specific structural arrangement, of course, will be dependent upon a particular need within the purview of the invention and it will be understood that certain of the known resilient materials from which inserts such as the insert 14 may be composed and of which the heat shrinkable sleeves may be composed have greater resistance to resilient deformation than others and therefore would provide a greater locking action. It will also be understood that in the event that the self-locking feature of the invention is to be availed of for purposes other than an electrical connection in which a sealing flange is desired, the resilient lock may be provided by heat shrinking the sleeve about the nut body so as to combine it with an insert or so as to provide an integral portion of the sleeve engageable with the stem, without axial extension of the sleeve past the end of the nut body. Indeed, it is within the purview of the invention that a band of heat shrinkable material may constitute the heat shrinkable sleeve and the band may have a width no greater than the slot into which it will shrink.

Other changes and alterations may be resorted to without departing from the spirit of the invention.

I claim:

1. In a self-locking fastener, comprising: a fastener body having a bore adapted to receive a stem, and an opening in a side wall thereof extending into said bore, and means in said bore engageable with said stem for retaining said body on said stem, the improvement wherein said means comprises resiliently deformable means extending into said bore including a separate resiliently deformable insert disposed in said opening and a resiliently deformable sleeve engaging said insert to restrain the same against outward displacement, said sleeve being of shrinkable material and having an attaching portion surrounding the outside of said body, said portion being shrunk into tight holding embrace with the body prior to its reception of said stem during use.

2. A self-locking fastener as defined in claim 1, wherein a plurality of said openings and said inserts are provided in angularly spaced relation about said body.

3. A self-locking fastener as defined in claim 1, wherein said opening is a chordal slot intersecting said bore, the side wall of said body having walls at the base of said opening engaged by said insert to prevent inward displacement of said insert.

4. A self-locking fastener as defined in claim 1, wherein said sleeve has an end portion providing a flange extending inwardly at an end of said body into close proximity to said bore.

5. A self-locking fastener as defined in claim 1 wherein said means in said bore also includes a thread, and said opening comprises a slot extending inwardly at least past the major diameter of said thread.

References Cited

UNITED STATES PATENTS

| 1,432,043 | 10/1922 | Van Horn | 151—25 |
| 2,425,228 | 8/1947 | Bloomfield | 151—7 |
| 2,709,608 | 5/1955 | Smith | 151—24 |

OTHER REFERENCES

IBM Technical Disclosure Bulletin, vol. 9, No. 3, August 1966, pp. 311–312.

EDWARD C. ALLEN, *Primary Examiner.*